Oct. 27, 1959
E. I. RYSCHKEWITSCH
2,910,371
STABILIZATION OF ZIRCONIA
Filed Sept. 29, 1953
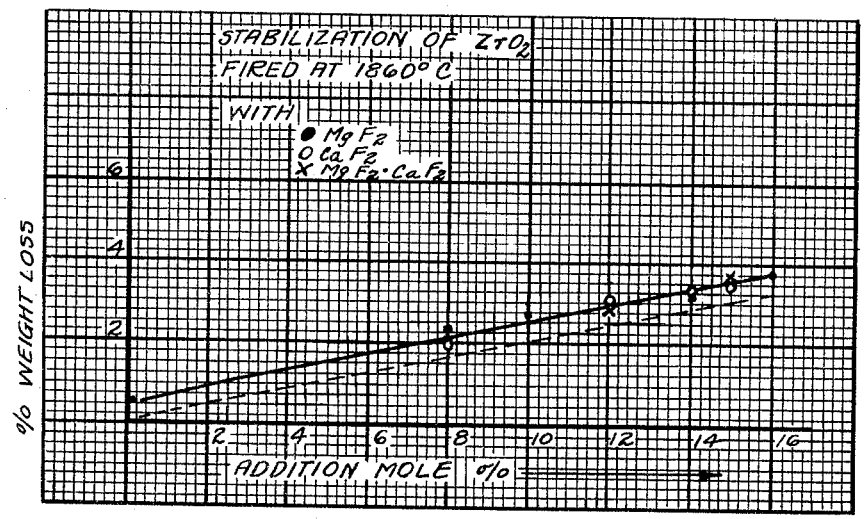
INVENTOR.
EUGENE RYSCHKEWITSCH
BY
ATTORNEYS United States Patent Office 2,910,371
Patented Oct. 27, 1959

2,910,371
STABILIZATION OF ZIRCONIA

Eugene I. Ryschkewitsch, Ridgewood, N.J., assignor to the United States of America as represented by the Secretary of the Air Force Application September 29, 1953, Serial No. 383,150

5 Claims. (Cl. 106—57)

(Granted under Title 35, U.S. Code (1952), sec. 266)

The invention described herein may be manufactured and used by or for the Government for governmental purposes without payment to me of any royalty thereon.

This invention relates to the stabilization of zirconia and more particularly to the stabilization of zirconia with the fluorides of calcium, magnesium, cerium and yttrium.

Pure zirconium oxide cannot be sintered to a stable ceramic body. Pure zirconium oxide undergoes a reversible transformation from a monoclinic crystal structure that it has at low temperatures to a tetragonal crystal structure at around 1000° C. This transformation is accompanied by a considerable change in volume that develops objectionable cracks during cooling. This transformation may be suppressed by the addition to the zirconia of alkaline earth oxides such as calcia, magnesia, or the like, prior to firing the mixture that then is a stable solid solution of cubic crystal structure up to its melting point and that cools without enough change in volume to develop objectionable cracks in the cooled object.

Representative practices are described in the "Journal of the American Ceramic Society," volume 35, pages 107 to 113, and in U.S. Patent No. 2,535,526 and elsewhere in the literature, using as additives the oxides and the carbonates of specified metals and heating to temperatures at which the solid and liquid states of the substance coexist in equilibrium under normal pressure. The preliminary sintering of zirconia with its oxide additive, milling, leaching out impurities etc., have made the oxide additive method of stabilizing zirconia in quantity complex and expensive. The stabilized zirconia produced by the above prior processes contained as admixtures alkaline earths as oxides or as carbonates or as both oxides and carbonates.

The present invention stabilizes zirconia by replacing the oxides in the above designated processes with corresponding fluorides to provide a process accomplished at materially lower temperatures, with less difficulty and at less expense. The practice of the present invention is attended by advantages that are not realized in the past alkaline earth oxide additive methods of stabilizing zirconia.

The stabilization of zirconia is recognized and both its chemical and its physical characteristics are defined in the more recent literature, such as at page 1196 of The Condensed Chemical Dictionary, fifth edition, published in 1956 by the Reinhold Publishing Corporation, New York city, New York.

This invention presents a mix or batch, a method, a process and a technique for stabilizing zirconia by heating together under specified conditions zirconia and a specified fluoride, that illustratively may be a fluoride selected from the group: calcium, magnesium, cerium, yttrium or an equivalent element.

The resultant batch of zirconia and fluoride additive is adapted for use without objectionable reaction with acids, such as the mineral acids, in the making of slip castings and the like, which cannot be accomplished with zirconia stabilized with comparable oxides because of the reactivity of the acid with the oxide stabilizing agent used with the zirconia.

An object of the present invention is to provide a product, a mix, a method and a technique or a process for accomplishing the stabilization of zirconia in a new and improved manner at a relatively low firing temperature in a furnace exposed to ambient air or other oxidizing atmosphere.

Another object is to provide a method for stabilizing zirconia that permits the use of an acid in slip casting a zirconia batch.

A further object is to provide a method and a mix for stabilizing zirconia that requires the addition of zirconia of stabilization accomplishing additives in smaller amounts than in the past use of oxides as additives for comparable results and at lower temperatures and with advantageous improvements in the refractoriness of the resultant products.

Other objects are to reduce the complexity, lower the cost, and improve the product in producing stabilized zirconia in quantity.

The first commercial production of sintered zirconia ware that was partly stabilized with magnesia was initiated by the present inventor and was reported at the annual meeting of the German Ceramic Society at Nuremberg, Germany, on September 30, 1930, as published in the Berichte der Deutschen Keramischen Gesellschaft (Reports of the German Ceramic Society), volume 11, pages 619–620, 1930. Crystal structure parameters of both the monoclinic and the tetragonal modifications of zirconia are very close to the parameters of the cubic structure of zirconia and hence a comparatively small internal stress that is imposed by the addition of specified oxides and sufficient heat converts the nearly cubic forms of zirconia to the completely cubic form that is stable.

This phenomenon of zirconia stabilization is comparable with the formation of austenitic steel wherein the transformation from gamma to alpha iron is suppressed by the addition of an alloying metal, such as nickel, forming solid solutions with iron.

In the exercise of the present invention chemically pure zirconium oxide of a grain size up to about 10 microns diameter is used. To this zirconium oxide is added finely powdered magnesium fluoride and calcium fluoride, both separately and together, in amounts up to 16 mol percent. The dry powders so combined are thoroughly mixed.

The combining with the zirconium oxide of fluorides of the previously designated alkaline-earth metals: calcium, magnesium, etc., as dry powders are then assured by having the powders mixed intimately, as in a porcelain ball mill, for about an hour. The resultant mix is then formed to a desired shape, as by dry pressing, slip casting with hydrochloric acid or the like, and the formed object is dried in the open air. Both magnesium fluoride and calcium fluoride have published solubilities appearing in chemical handbooks and the like.

The firing of the dried formed objects is accomplished in an oxidizing furnace using natural gas or other hydrocarbons as a fuel. The atmosphere of the furnace air is that of usual air composition inclusive of some water vapor. Firing is accomplished at 1400° C. at which temperature the stabilization is completed but the structure is porous. Density is acquired by firing to 1800° C. for a time depending on the size, wall thickness, shape, etc., of the object. With 15.5 mol percent magnesium fluoride practically complete stabilization is accomplished, as proved experimentally, after four firings of about one hour each. Experimentally firing at 1300° C. with 15 mol percent calcium fluoride and the same time resulted in practically complete stabilization of the zirconia to its stable crystalline cubic form.

The resultant stabilized zirconia was subjected to tests with a polarizing microscope to confirm its stable cubic form and with an X-ray diffraction instrument to determine its crystal space lattice. The prepared zirconia remained stable from room temperature through the entire range of temperature up to the temperature at which the solid and the liquid states of the zirconia coexist in equilibrium under normal pressure. The term "melting point" appearing herein is used in its ordinary dictionary definition of that temperature at which solid and liquid states of a substance coexist in equilibrium under normal pressure.

A definite stabilization effect was accomplished experimentally by the addition of 6 mol percent of an alkaline earth fluoride. A complete stabilization effect was accomplished experimentally by the addition of 16 mol percent of an alkaline earth fluoride.

A reaction of interest, with water vapor normally and inevitably present in the furnace atmosphere, is that the alkaline earth fluorides oxidize with the liberation in the gaseous state of hydrogen fluoride. In their newly formed nascent state the alkaline earth oxides avidly react with and dissolve in the solid zirconia much more readily and actively than when initially inert alkaline earth oxides and zirconia are mixed together at room temperature and are heated to even a much higher temperature.

The fluorine ion is known to be similar in many respects to the hydroxyl ion and the two ions are known to be mutually interchangeable, from findings in crystal chemistry and in mineralogy. Fluorine, oxygen, and hydroxyl ions have almost identical radii of F'—1.5A; OH'—1.4A and O''—1.4A.

In the experimentation out of which the present invention evolved, fluorides of alkaline earths in mol percentages of 0, 8, 10, 12, 14, 14.5, 15, 15.5 and 16 were added to zirconia remainder. Each addition was made in three compositions: (1) $MgF_2$, (2) $CaF_2$ and (3) $MgF_2+CaF_2$ in equal mol percentage. The dry powders were mixed in a ball mill, formed by both dry-pressing and by slip casting, dried and fired. During firing the reaction taking place within the furnace depended on the mix as:

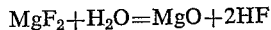
$$MgF_2+H_2O=MgO+2HF$$
and
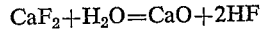
$$CaF_2+H_2O=CaO+2HF$$

Due to the comparatively small weight percent of additions, the differences of weight losses of specimens with magnesia, as compared to those with calcia were insignificant. A graph shown in the single figure of the accompanying drawing charts the mol percent addition of fluoride along the abscissa and the percentage of weight loss along the ordinate for zirconia specimens with alkaline earth fluorides fired at 1860° C. and shows a linear function or straight line relationship not passing through the coordinate zero point but cutting the ordinate axis at 0.5% ignition weight loss. Zirconia and hafnium may be separated as insoluble hydroxides together. The solids are filtered out and the filter cake is dried and calcined to the oxides. It may be that the ignition weight loss referred to above is due to a residual hydroxide contamination in the zirconia during its conversion to the oxide which is believed to be more probable than the presence of water of crystallization, although water of crystallization is shown in zirconia at page 626 of the Handbook of Chemistry and Physics, 37th edition, 1955–1956, published by the Chemical Rubber Publishing Company of Cleveland, Ohio. In the accompanying graph the solid line data was determined experimentally and the dash line is theoretical, with the difference along the ordinate the ignition weight loss. The dots on the graph are experimental determinations using magnesium fluoride; the hollow circles are experimental determinations using calcium fluoride; and the X points are experimental determinations using mixtures of magnesium fluoride and calcium fluoride as shown on the curve itself. The first actual experimental determination point on the ordinate indicates no magnesium fluoride in the zirconia and is an extrapolation of the solid line to zero. The parallel transplantation of the graph line to the zero point of the coordinates results in a dash line which coincides perfectly with the theoretical weight losses of the added fluorides, proving that a complete conversion of fluoride to oxide without any evaporation loss has occurred. The experimental graph suggests an addition range of about from 3 to 16 mol percent alkaline earth fluoride. Complete conversion of the zirconia with both magnesium fluoride and with calcium fluoride was accomplished in two hours firing with the furnace held at 1400° C. The amounts of magnesium fluoride and of calcium fluoride and of mixtures thereof, which appear along the abscissa of the graph, are expressed as molal percentages.

The structure of fired specimens was examined with an X-ray identification camera recording the intensity of the characteristic wave length of reflected X-rays and with a polarizing microscope using thin sections. The results were practically identical with the polarizing microscope, the more sensitive method, since it permitted the detection of individual birefringent crystals in a multitude of cubic crystals.

The lower limit experimentally for the complete conversion of zirconia to the cubic form was the addition to the zirconia of 15.5 mol percent of $MgF_2$ or $CaF_2$, or both together. With this quantity of additive concentration, individual birefringent crystals were still detectable whereas with a concentration of 16 mol percent of alkaline earth additive to the zirconia no birefringent crystals were observed.

A practically complete stabilization of zirconia was accomplished with 15 mol percent $CaF_2$ in the zirconia fired at 1300° C. after four one-hour firings, wherein a plurality of samples were placed in the furnace and a different sample was withdrawn and tested at the end of each hour, by which procedure it was found that the fourth sample of zirconia was satisfactorily stabilized. The practically complete stabilization of zirconia was accomplished with 15 mole percent $MgF_2$ fired at 1400° C. after four one-hour firings, which again means that a plurality of samples were placed in the furnace from which a different sample was withdrawn at the end of each hour and tested for the stabilization of the zirconia in that sample. Again by this procedure the fourth sample which had been heated for four hours was found to consist of satisfactorily stabilized zirconia. The reason for this greater temperature requirement for $MgF_2$ is believed to be because the ion radius of zirconium of 0.9A. is closer to that of calcium 1.0A. than it is to magnesium 0.75A. It would appear that the magnesia and calcia in the nascent state, freshly formed from the corresponding fluorides, react more eagerly, more completely, and at lower temperatures, than in previous methods using the comparatively more inert initial oxides. No evidence of any shifting of the stabilization limits was observed between the temperature range from 1300° C. to about 1900° C.

It is to be understood that the stabilized zirconia resulting from and the method or the technique of stabilizing the zirconia that are disclosed herein and that equivalent articles and methods, modified for a particular adaptation, are within the scope of the present invention.

What I claim is:

1. The process of forming chemically stabilized zirconia by mixing zirconia and less than about 16 mol percent of a fluoride selected from the group consisting of calcium, magnesium, cerium, yttrium, and mixtures thereof, intimately intermingling the ingredients of the mix; adding a dilute mineral acid to convert the mixture of the fluoride and zirconia into an acid slip; casting the acid slip to form an object of the desired shape; drying the formed object, and firing the dried formed object in the presence of sufficient water vapor to convert the fluoride present to the corresponding oxide, to form a substantially homogeneous article of continuously cubic space lattice zirconia.

2. The process of claim 1 where the formed object is fired for about 4 hours at a temperature between 1350° and 1900° C.

3. The process of claim 2 where the fluoride concentration is from about 3 to about 16 mol percent.

4. The process of claim 3 where the mineral acid is hydrochloric acid.

5. The process of forming chemically stabilized zirconia by mixing zirconia and 3 to 16 mol percent magnesium fluoride, intimately intermingling the ingredients of the mix, adding dilute hydrochloric acid to convert the mixture into an acid slip, casting the acid slip to form an object of the desired shape, drying the formed object and firing the dried formed object at a temperature of about 1400° C. for about 4 hours in the presence of sufficient water vapor to convert the fluoride present to the corresponding oxide, in order to form a substantially homogeneous article of continuously cubic space lattice zirconia.

References Cited in the file of this patent

UNITED STATES PATENTS

| | | |
|---|---|---|
| 1,969,099 | Ryschkewitsch | Aug. 7, 1934 |
| 2,152,655 | McDougal et al. | Apr. 4, 1939 |
| 2,535,526 | Ballard et al. | Dec. 26, 1950 |